United States Patent Office 3,313,996
Patented Apr. 11, 1967

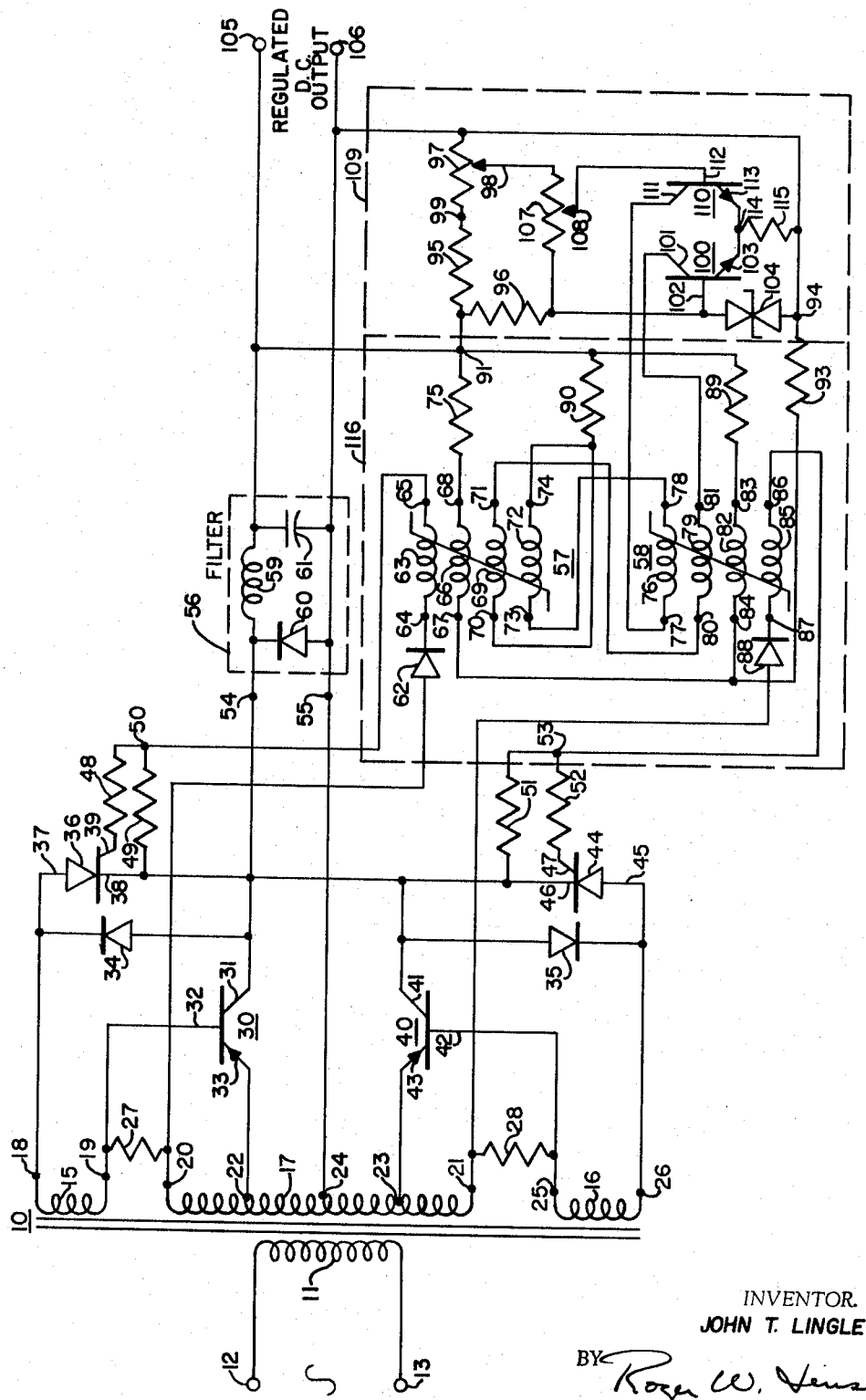

3,313,996
RECTIFIER CONTROL APPARATUS
John T. Lingle, Bloomington, Minn., assignor to Honeywell Inc., Minneapolis, Minn., a corporation of Minnesota
Filed May 4, 1964, Ser. No. 364,445
4 Claims. (Cl. 321—16)

This invention relates to a rectification circuit with a unique biasing arrangement for maximum efficiency in power transfer.

When electric power is derived from such sources as fuel cells or solar cells the output voltage of a single cell is often too low for most applications. For practical use this voltage must be stepped up by either adding such cells in series or by utilizing a voltage converter. Connecting the cells in series reduces the system reliability and often also introduces other difficulties. A solution to this problem can be achieved by use of a single large capacity power source cell in combination with a low input voltage D.C. to D.C. converter.

In a D.C. to D.C. converter the low voltage signal from a low voltage cell is changed into an A.C. signal by a chopper or an oscillator. The A.C. signal is then stepped up by a transformer and rectified. The present invention provides an improved rectification circuit for use in such a low input voltage conversion system. It is essential in a system of this kind that the efficiency is maintained at the maximum which can be obtained. In view of this it is desirable to limit the number of dissipative elements between the input and the output terminals to a minimum.

It is the object of the present invention to provide an improved rectifying circuit.

It is a further object of the present invention to provide an efficient low input voltage converter circuit.

These and further objects will become apparent to those skilled in the art upon the investigation of the following specification, claims, and drawing in which the single figure is a schematic diagram of the rectifier circuit with feedback for regulated output voltage.

Referring now to the drawing a primary winding 11 of a transformer 10 is connected between input terminals 12 and 13. Transformer 10 further has a secondary winding 15 with end terminals 18 and 19, a secondary winding 16 with end terminals 25 and 26, and a secondary winding 17 with end terminals 20 and 21 and further having intermediate tap connections 22, 23 and 24. End terminal 19 of secondary winding 15 is connected to a base electrode 32 of a transistor 30. Transistor 30 further has a collector electrode 31 and an emitter electrode 33. Collector electrode 31 is connected directly to a terminal 54 and also to end terminal 18 of secondary winding 15 through a diode 34. Diode 34 is oriented for forward current flow from collector 31 to end terminal 18 of winding 15. Emitter electrode 33 of transistor 30 is connected to intermediate tap connection 22 on secondary winding 17.

End terminal 25 of secondary winding 16 is connected directly to a base electrode 42 of a transistor 40. Transistor 40 further has a collector electrode 41 and an emitter electrode 43. Collector electrode 41 of transistor 40 is connected directly to collector electrode 31 of transistor 30 and also to end terminal 26 of secondary winding 16 through a diode 35. Diode 35 is connected for forward current flow from collector 41 to end terminal 26. Emitter electrode 43 of transistor 40 is connected to intermediate tap connection 23 on winding 17. End terminal 20 of winding 17 is connected to end terminal 19 of winding 15 through a resistor 27 and is also connected to an end terminal 64 of winding 63 of a saturable core transformer 57 through a diode 62. Diode 62 is connected for forward current flow from end terminal 20 of winding 17 to end terminal 64 of winding 63. Winding 63 further has an end terminal 65. Transformer 57 has additional winding 66 with end terminals 67 and 68, winding 69 with end terminals 70 and 71, and winding 72 with end terminals 73 and 74.

End terminal 21 of winding 17 is connected to end terminal 25 of winding 16 through a resistor 28. End terminal 21 of winding 17 is further connected to an end terminal 87 of a winding 85 of a saturable core transformer 58 through a diode 88. Diode 88 is oriented for forward current flow from end terminal 21 of winding 17 to end terminal 87 of winding 85. Winding 85 further has an end terminal 86. Transformer 58 has additional winding 82 with end terminals 83 and 84, winding 79 with end terminals 80 and 81, and winding 76 with end terminals 77 and 78. Transformers 57 and 58 together comprise a pulse width modulation regulator 16.

End terminal 18 of winding 15 of transformer 10 is connected to an anode 37 of a silicon controlled rectifier 36. Silicon controlled rectifier 36 further has a cathode electrode 38 and a gate electrode 39. Cathode electrode 38 is connected directly to collector terminal 31 of transistor 30 and gate electrode 39 is connected to a terminal 50 through a resistor 48. A resistor 49 is connected between terminal 50 and cathode electrode 38 of rectifier 36. Terminal 50 is connected to end terminal 65 of winding 63 on transformer 57.

End terminal 26 of winding 16 on transformer 17 is connected to an anode electrode 45 of a silicon controlled rectifier 44. Silicon controlled rectifier 44 further has a cathode electrode 46 and a gate electrode 47. Cathode electrode 46 is connected to collector electrode 41 of transistor 40 and gate electrode 47 is connected to a terminal 53 through a resistor 52. A resistor 51 is connected between terminal 53 and cathode electrode 46 of rectifier 44. Terminal 53 is connected to end terminal 86 of winding 85 of transformer 58.

Intermediate tap connection 24 of secondary winding 17 on transformer 10 is connected to a terminal 55 which in turn is connected directly to an output terminal 106. A diode 60 is connected between terminals 54 and 55 and is oriented for forward current flow from terminal 55 to terminal 54. An inductor 59 is connected between terminal 54 and an output terminal 105 and a capacitor 61 is connected between output terminals 105 and 106. Diode 60, inductor 59, and capacitor 61 comprise a filter network 56.

End terminal 68 of winding 66 on saturable transformer 57 is connected through a resistor 75 to terminal 91 which in turn is connected directly to output terminal 105. End terminal 67 of winding 66 is connected to end terminal 84 of winding 82 on saturable transformer 58 and also to a terminal 94 through a resistor 93. End terminal 83 of winding 82 is connected to terminal 91 through a resistor 89.

End terminal 70 of winding 69 on transformer 57 is connected to end terminal 74 of winding 72 and is also connected to terminal 91 through resistor 90. End terminal 71 of winding 69 is connected to end terminal 80 of winding 79 on transformer 58 and end terminal 73 of winding 72 is connected to end terminal 78 of winding 76.

End terminal 77 of winding 76 on transformer 58 is connected to a collector electrode 111 of a transistor 110. Transistor 110 further has a base electrode 112 and an emitter electrode 113. End terminal 81 of winding 79 on transformer 58 is connected to a collector electrode 101 of a transistor 100. Transistor 100 further has a base electrode 102 and an emitter electrode 103. Emitter 103 of transistor 100 is connected directly to emitter 113 of transistor 110 and also to terminal 94 through a resistor 115. A symmetrical zener diode is connected between base 102 of transistor 100 and terminal 94. Terminal 94 is connected directly to output terminal 106.

A resistor 95 is connected between terminal 91 and a terminal 99. A potentiometer 97 is connected between terminal 99 and output terminal 106. Potentiometer 97 has a wiper 98 connected to one end of a potentiometer 107. Potentiometer 107 has its other end connected to base 102 of transistor 100. Potentiometer 107 also has a wiper 108 connected to base electrode 112 of transistor 110. A resistor 96 is connected between base electrode 102 of transistor 100 and terminal 91.

Transistors 100 and 110, together with the symmetrical zener diode 104 and the associated bias network, comprise an error detector responsive to the variations of the output voltage between output terminals 105 and 106 from the desired value.

*Operation*

Transistors 30 and 40 are connected to form a full wave pulse width modulated rectification circuit. Transistors 30 and 40 are biased with respect to the collector by windings 15 and 16 through silicon controlled rectifiers 36 and 44 respectively. The transistors are forward biased to have very low forward saturation resistance and back biased to have high inverse impedance when operated in the inverted mode. The type of biasing arrangement used here eliminates the need for the diodes conventionally used in the collector or the emitter current path to prevent the operation of the transistor in the reverse direction when it is operated in the inverted mode. A lower saturation voltage and higher efficiency can be obtained when a transsitor is used in place of diode, SCR or other means.

Assume that the instantaneous polarity of the signal between input terminals 12 and 13 across the primary winding 11 is such that terminal 18 of secondary winding 15, terminal 20 of secondary winding 17, and terminal 25 of secondary winding 16 are positive with respect to the other end terminals of the respective windings. With this polarity, base electrode 32 of transistor 30 is biased negative with respect to collector 31 through winding 15 and the silicon controlled rectifier 36. When the silicon controlled rectifier 36 is conducting, this biases transistor 30 into the saturation conduction region, since base 32 is negative with respect to emitter 33 and collector 31, and power passes from winding 17 through transistor 30 into filter circuit 56. At the same instant, with the above winding polarities, transistor 40 has inverse polarity impressed across it since its emitter 43 is negative with respect to its collector 41. When operated in this inverted mode, collector 41 serves as an emitter, and emitter 43 serves as a collector. Transistor 40 is biased "off" with respect to collector 41 through secondary winding 16 on transformer 10 and diode 35 which apply a positive voltage to base electrode 42 with respect to collector electrode 41. Thus the drive winding arrangement forward biases transistor 30 in the forward mode turning it "on," and back biases transistor 40 in the inverted mode maintaining it "off."

When the signal across primary winding 11 changes its polarity, transistor 30 will be operated in the inverted mode and back biased through winding 15 and diode 34. With this polarity, transistor 40 is forward biased into conduction to supply power to filter network 56.

Rectification losses of this circuit, including the drive power required to forward bias and back bias the transistor, will be less than could be obtained by the conventional biasing arrangement.

The D.C. voltage appearing at the output of filter network 56 between output terminals 105 and 106 is regulated by a feedback arrangement comprised of error detector 109 and pulse width modulation regulator 116. Regulation is accomplished by delaying the gate which turns either silicon controlled rectifier 36 or silicon controlled rectifier 44 "on" after the polarity between input terminals 12 and 13 changes. During the delay interval, transistors 30 and 40 will be back biased "off" by current flowing through winding 17 and resistors 27 or 28 to the respective transistor base. After either silicon controlled rectifier is gated "on," the forward bias signal predominates and switches the respective rectifier transistor into the low resistance saturation region to send power into filter circuit 56.

Pulse width modulation of the rectification circuit is controlled by error detector 109 and magnetic amplifier circuit 116. Transistors 100 and 110 in the error detector circuit form a standard differential detector circuit connected across the output terminals 105 and 106. An output voltage sample is applied to base 112 of transistor 110 through resistors 95, 97, and 107. Base 102 of transistor 110 is connected to zener diode reference 104. The small difference between the output voltage sample and the reference is amplified to provide an error signal at collectors 101 and 111 of transistors 100 and 110. The collector current flows through windings on the saturable core transformers 58 and 57 to control the degree of flux reset in the respective cores. The winding polarities are such that current flowing into collector 111 of transistor 110 tends to reset saturable core reactors 57 and 58 thus increasing the delay time. Current flowing through collector 101 of transistor 100, on the other hand, tends to saturate the cores thus reducing the delay time. The error circuit controls the flux level or the voltage time integral required to saturate the core, and hence determines the pulse delay time. When the signal polarity across the transformer 10 is such that a positive voltage is applied to emitter 33 of transistor 30, current flows from secondary winding 17 of transformer 10 through diode 62 through winding 63 of transformer 57 to resistor 49, resistor 48, and gate 39 of silicon controlled rectifier 36. When the core of transformer 57 is not saturated, its impedance is high and the current flow is insufficient to gate silicon controlled rectifier 36 "on." However, when the core of transformer 57 saturates after the controlled time delay, the impedance of winding 63 decreases to nearly zero and a large current pulse flows to gate 39 of controlled rectifier 36 and switches it into conduction. This in turn switches transistors 30 "on" and applies a pulse of power to output filter 56.

The circuitry described completes a closed loop system which controls the output voltage between output terminals 105 and 106 by pulse width modulation. Regulation in this manner should provide the desired regulated output at the highest efficiency because the number of components in series with the power flow path is minimized. It will be noted that with the exception of filter network 56 only transistors 30 and 40 separate output terminal 105 from secondary winding 17 of transformer 10.

The pulse width modulated rectiled output is applied to filter circuit 56. Diode 60 provides a circuit path for the inductor current during the switching and pulse delay intervals. When pulse width modulation is introduced into the circuit at transistors 30 and 40, diode 60 will pass current for an appreciable length of time since input energy pulses will have voids that must be filled by release of inductor coil stored energy.

Many variations and embodiments are possible within the spirit of this invention. It is, therefore, understood that the specific embodiment of my invention shown here is for the purpose of illustration only, and that my invention is limited only by the scope of the appended claims.

I claim as my invention:

1. A rectification circuit for converting an alternating voltage to a direct voltage, said circuit comprising:
   a pair of input terminals for connection to an alternating voltage source;
   a first and a second output terminal;

a first and a second transistor, each having an emitter electrode, a collector electrode, and a control electrode;

a voltage transformer having a primary winding connected between said input terminals, a first secondary winding connected between said control and said collector electrodes of said first transistor, a second secondary winding connected between said control and said collector electrodes of said second transistor, and a third secondary winding connected between the emitter electrodes of said first and said second transistors, said third secondary winding further having an intermediate tap connected to said first output terminal, the sense of said secondary windings being such that at each transistor the polarity of the collector with respect to the base is the same as the polarity of the emitter with respect to said intermediate tap; and means connecting said second output terminal to the collector terminals of said first and said second transistors.

2. A regulated power supply comprising:

a pair of input terminals for connection to a source of alternating voltage providing signals of first and second polarity;

a first and a second output terminal;

a means for stepping up and rectifying said alternating voltage including a transformer having a primary winding connected between said two input terminals and a secondary winding having two ends and an intermediate tap;

a first and a second transistor each having an emitter, a collector, and a base;

means connecting one end terminal of said secondary winding to the emitter of said first transistor and the other end terminal of said secondary windings to the emitter of said second transistor;

means connecting the collectors of said two transistors to said first output terminals;

means connecting said tap to said second output terminal;

control means connected to the bases of said first and said second transistors to render said first transistors conductive when the output of said voltage source is of said first polarity and to render said second transistor conductive when the output of said voltage source is of said second polarity; and bias means connected between the collector and the base electrodes of each said transistor adapted to apply a reverse bias on the collector-base junction of said second transistor when the signal from said voltage source is of said first polarity and to apply a reverse bias on the collector-base junction of said first transistor when the signal from said voltage source is of said second polarity.

3. A rectification circuit for converting an alternating voltage to a direct voltage, said circuit comprising:

a pair of input terminals for connection to an alternating voltage source;

a first and a second output terminal;

a first and a second transistor, each having an emitter electrode, a collector electrode, and a base electrode;

a voltage transformer having a primary winding connected between said input terminals, a first secondary winding connected between said base and said collector electrodes of said first transistor, a second secondary winding connected between said base and said collector of said second transistor, and a third secondary winding connected between the emitter electrodes of said first and said second transistors, said third secondary winding further having an intermediate tap connected to said first output terminal, said secondary windings being oriented such that at each transistor the polarity of the collector electrode with respect to the base electrode is the same as the polarity of the emitter electrode with respect to said intermediate tap;

means connecting said second output terminal to the collector terminals of said first and said second transistors;

a first switching means connected between the base and the collector electrodes of said first transistor;

a second switching means connected between the base and the collector electrodes of said second transistor; and control means connected to said first and said second switching means to operate said switching means and thereby pulse width modulate the signals appearing between said first and said second output terminals.

4. A regulated power supply comprising:

a pair of input terminals for connection to a source of alternating voltage;

a first and second transistor, each having an emitter electrode, a collector electrode, and a base electrode;

a voltage transformer having a primary winding connected between said input terminals, a first secondary winding connected between said base and said collector electrodes of said first transistor, a second secondary winding connected between said base and said collector electrodes of said second transistor, and a third secondary winding connected between the emitter electrodes of said first and said second transistors, said third secondary windings further having an intermediate tap connection, said secondary windings being oriented such that at each transistor the polarity of the collector electrode with respect to the base electrode is the same as the polarity of the emitter electrode with respect to said intermediate tap;

a first semiconductor switching means having an input, and output and a gate electrode, said input and output electrodes of said first switching means being connected in series with said first secondary winding between the collector and the base electrodes of said first transistor;

a second semiconductor switching means having an input, an output and a gate electrode, said input and said output electrodes of said second switching means being connected in series with said second secondary winding between the collector and the base electrodes of said second transistor;

a filter network having first and second input terminals, and first and second output terminals;

means connecting said first input of said filter network to the collector terminals of said first and said second transistors;

means connecting said second input terminal of said filter network to said intermediate tap connection on said third secondary winding;

an error detector having a first and a second input connected to the first and the second output terminals of said filter network; and a pulse width modulation regulator connected to receive signals from said error detector network, said pulse width modulation regulator having a first output connected to the gate electrode of said first semiconductor switching means and a second output connected to the gate electrode of said second semiconductor switching means.

References Cited by the Examiner

UNITED STATES PATENTS

| | | | |
|---|---|---|---|
| 2,987,665 | 6/1961 | Thompson | 321—8 |
| 3,195,036 | 7/1965 | McNulty. | |
| 3,219,906 | 11/1965 | Keller | 321—18 |
| 3,219,907 | 11/1965 | Josephson | 321—18 |
| 3,246,229 | 4/1966 | Lloyd | 321—18 |

JOHN F. COUCH, *Primary Examiner.*

M. L. WACHTELL, *Assistant Examiner.*